(12) United States Patent
Tajiri et al.

(10) Patent No.: US 12,090,712 B2
(45) Date of Patent: Sep. 17, 2024

(54) METHOD OF MANUFACTURING COMPOSITE, AND COMPOSITE

(71) Applicant: SUBARU CORPORATION, Tokyo (JP)

(72) Inventors: Keisuke Tajiri, Tokyo (JP); Daisuke Hirabayashi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 82 days.

(21) Appl. No.: 17/157,450

(22) Filed: Jan. 25, 2021

(65) Prior Publication Data
US 2021/0268750 A1 Sep. 2, 2021

(30) Foreign Application Priority Data

Feb. 28, 2020 (JP) ................. 2020-033179

(51) Int. Cl.
*B29C 70/20* (2006.01)
*B29C 43/20* (2006.01)
*B32B 5/02* (2006.01)

(52) U.S. Cl.
CPC .............. *B29C 70/20* (2013.01); *B29C 43/20* (2013.01); *B32B 5/024* (2013.01); *B32B 2262/106* (2013.01)

(58) Field of Classification Search
CPC ......... B29C 70/20; B29C 43/20; B32B 5/024; B32B 2262/106
USPC ...................................... 428/299.1
See application file for complete search history.

(56) References Cited

U.S. PATENT DOCUMENTS

| 5,190,802 A | * | 3/1993 | Pilato ............... B32B 27/32 |
| | | | 428/110 |
| 5,217,766 A | | 6/1993 | Flone et al. |
| 2008/0274322 A1 | | 11/2008 | Kaps et al. |
| 2016/0040651 A1 | | 2/2016 | Yarbrough et al. |
| 2019/0202142 A1 | | 7/2019 | Uehara |

FOREIGN PATENT DOCUMENTS

| EP | 0 488 389 B1 | 10/1996 |
| EP | 1 408 152 B1 | 6/2010 |
| JP | WO2018/051445 A1 | 6/2019 |
| WO | WO 2010/040359 A1 | 4/2010 |

OTHER PUBLICATIONS

Japanese Office action Patent Application No. 2020-033179 issued on Dec. 12, 2023 with English translation thereof.

* cited by examiner

*Primary Examiner* — Vincent Tatesure
(74) *Attorney, Agent, or Firm* — MCGINN I.P. LAW GROUP, PLLC

(57) ABSTRACT

A method of manufacturing a composite includes bringing a first surface of a first base in which a first fiber base that is to constitute the first base is impregnated with a first resin into contact with a second surface of a second base in which a second fiber base that is to constitute the second base is not impregnated with a second resin, and impregnating the second fiber base with a portion of the first resin with which the first fiber base is impregnated.

8 Claims, 4 Drawing Sheets

METHOD OF MANUFACTURING COMPOSITE, AND COMPOSITE

CROSS-REFERENCE TO RELATED APPLICATIONS

The present application claims priority from Japanese Patent Application No. 2020-033179 filed on Feb. 28, 2020, the entire contents of which are hereby incorporated by reference.

BACKGROUND

The disclosure relates to a method of manufacturing a composite, and a composite.

Composites (fiber reinforced plastics (FRP)) in which a fiber base is combined with a resin (a plastic) are lightweight and strong. Hence, the composites are used for structural materials and so forth in the fields of automobiles, aircrafts, and space.

A composite is manufactured by stacking fiber bases (prepregs) impregnated with a resin to form a multilayer body and then setting the resin (for example, International Publication No. 2018/051445).

SUMMARY

An aspect of the disclosure provides a method of manufacturing a composite. The method includes bringing a first surface of a first base in which a first fiber base that is to constitute the first base is impregnated with a first resin into contact with a second surface of a second base in which a second fiber base that is to constitute the second base is not impregnated with a second resin, and impregnating the second fiber base with a portion of the first resin with which the first fiber base is impregnated.

An aspect of the disclosure provides a composite including a first fiber base, a second fiber base, a first resin, and a second resin. The second fiber base has one surface that is in contact with one surface of the first fiber base. The first resin fills a portion of the second fiber base and the first fiber base. The second resin fills the second fiber base and is in contact with the first resin. A boundary plane between the first resin and the second resin is formed on an inner side of the second fiber base with respect to a contact plane between the one surface of the first fiber base and the one surface of the second fiber base.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

When prepregs impregnated with different resins are stacked on each other, the boundary of the resins is located between a first fiber base and a second fiber base impregnated with the different resins.

Hence, the peeling strength between the fiber bases is decreased, a crack may progress between the fiber bases, and inter-layer peeling may occur.

It is desirable to provide a method of manufacturing a composite capable of increasing the peeling strength between fiber bases, and to provide the composite.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
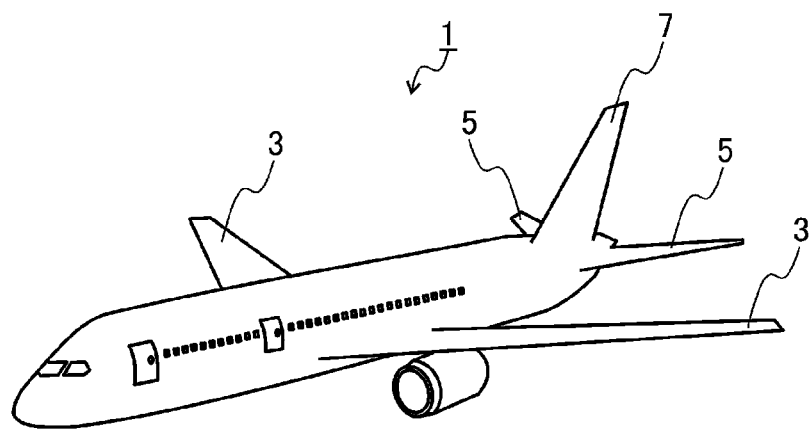
FIG. 1 is a schematic perspective view of an aircraft.
Figure 2:
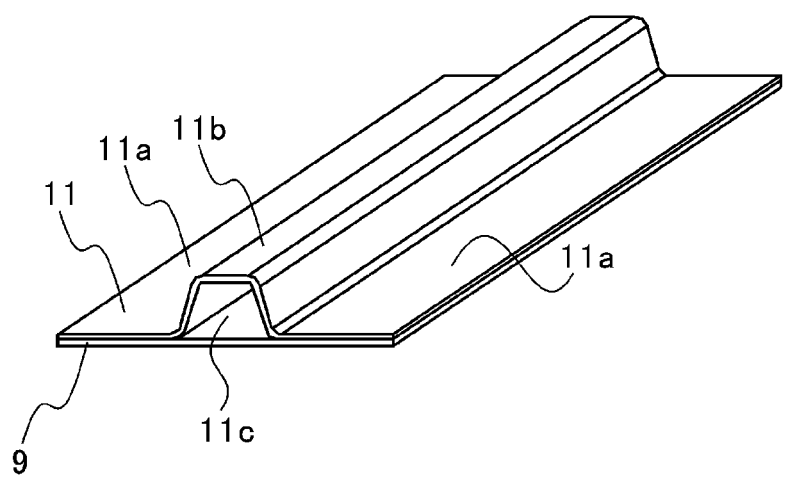
FIG. 2 is a vertical sectional view illustrating a portion of a wing of the aircraft.

FIG. 1 is a schematic perspective view of an aircraft 1. As illustrated in FIG. 1, the aircraft 1 includes a main wing 3, a horizontal tail 5, and a vertical tail 7 (hereafter, also merely referred to as wings). FIG. 2 is a vertical sectional view illustrating a portion of a wing of the aircraft 1. As illustrated in FIG. 2, the wing of the aircraft 1 includes an outer plate 9 and a stringer 11.

The outer plate 9 defines an outer shell of the wing of the aircraft 1. The outer plate 9 has, for example, a flat-plate shape. The stringer 11 is attached to the outer plate 9. The stringer 11 functions as a reinforcement that reinforces the outer plate 9. The stringer 11 includes a coupling portion 11a and a protrusion 11b. The coupling portion 11a is coupled to the outer plate 9. The protrusion 11b is continued to the coupling portion 11a and is separated from the outer plate 9. A hollow 11c is formed between the protrusion 11b and the outer plate 9. The stringer 11 is, for example, one of a hat-shaped hat stringer and a wave-shaped corrugated stringer. FIG. 2 illustrates an example in which the stringer 11 is a hat stringer; however, the stringer 11 is not limited thereto, and may be a corrugated stringer. In this case, a corrugated stringer has a shape including a plurality of hat stringers, each of which is illustrated in FIG. 2, continued in a left-right direction in FIG. 2. The outer plate 9 and the stringer 11 are constituted of a composite.

A method of manufacturing a composite according to the embodiment, for example, a method of permanently affixing the outer plate 9 and the stringer 11 is described below.

Method of Manufacturing Composite

Figure 3:
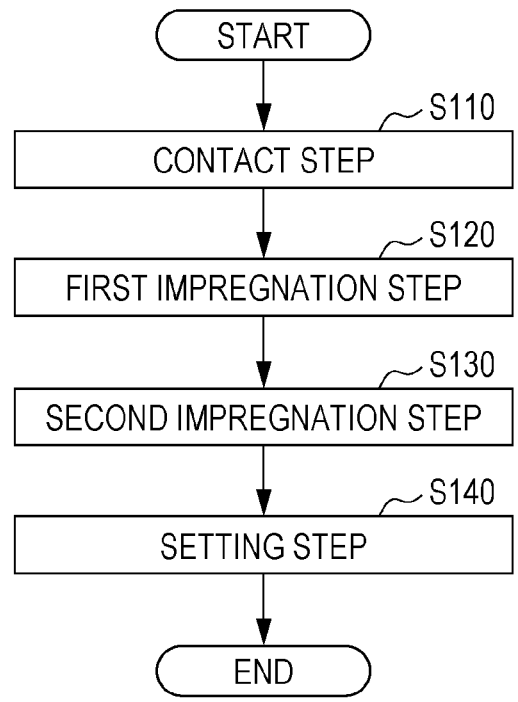
FIG. 3 is a flowchart illustrating a flow of processes of a method of manufacturing a composite according to an embodiment.
Figure 4:
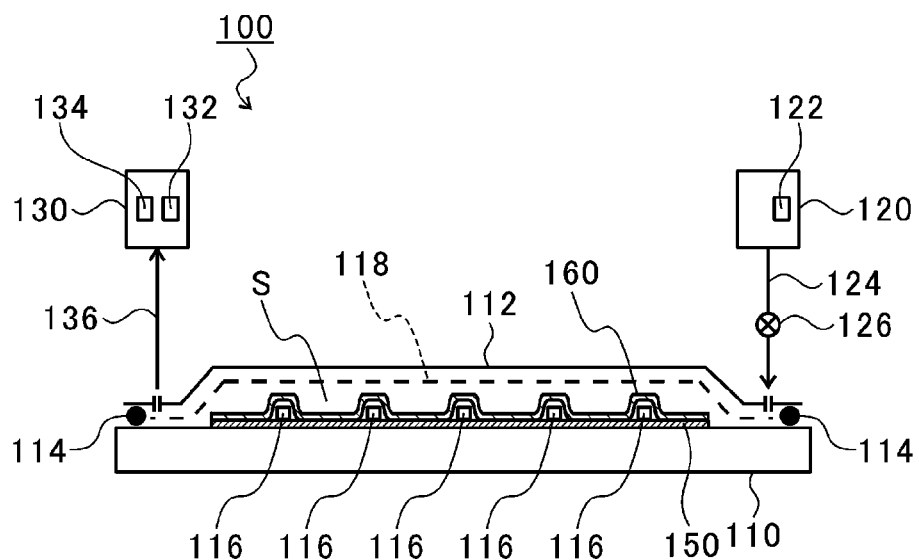
FIG. 4 is a diagram illustrating a composite manufacturing apparatus that is used in the method of manufacturing the composite according to the embodiment.

FIG. 3 is a flowchart illustrating a flow of processes of the method of manufacturing the composite according to the embodiment. FIG. 4 is a diagram illustrating a composite manufacturing apparatus 100 that is used in the method of manufacturing the composite according to the embodiment.

As illustrated in FIG. 3, the method of manufacturing the composite according to the embodiment includes a contact step S110, a first impregnation step S120, a second impregnation step S130, and a setting step S140. In the embodiment, the composite manufacturing apparatus 100 executes the contact step S110, the first impregnation step S120, the second impregnation step S130, and the setting step S140. Hereafter, the composite manufacturing apparatus 100 is described first blow.

Composite Manufacturing Apparatus 100

In the embodiment, the composite manufacturing apparatus 100 is an apparatus that manufactures (forms) a composite by a vacuum resin transfer molding (VaRTM) method. As illustrated in FIG. 4, the composite manufacturing apparatus 100 includes a forming die 110, a film 112, a seal 114, a jig (a core) 116, a resin diffusing medium 118, a resin supply 120, and a resin exhaust 130.

A space S is formed between the forming die 110 and the film 112. The space S is hermetically sealed by the seal 114 disposed between the forming die 110 and the film 112. The jig 116, the resin diffusing medium 118, a first base 150, and a second base 160 are disposed in the space S.

The first base 150 is placed on the forming die 110. The first base 150 corresponds to the outer plate 9. The jig 116 is placed on the first base 150. The jig 116 has an external shape substantially equivalent to the shape of the hollow 11c (see FIG. 2) formed between the protrusion 11b of the stringer 11 and the outer plate 9. The jig 116 holds the shape of the protrusion 11b (see FIG. 2) after the formation of the stringer 11. Thus, the external shape of the jig 116 is formed into the inner-surface shape of the protrusion 11b of the stringer 11. The jig 116 extends in a depth direction in FIG. 4.

The second base 160 is placed on the first base 150 from above the jig 116. That is, the jig 116 is disposed between the first base 150 and the second base 160. A portion of the second base 160 comes into contact with the first base 150. The second base 160 corresponds to the stringer 11. The first base 150 and the second base 160 will be described later in detail.

The resin diffusing medium 118 is placed on the second base 160. The resin diffusing medium 118 uses, for example, a net made of polyethylene or the like, and uniformly diffuses a second resin supplied from the resin supply 120 (described later) into the space S.

The resin supply 120 and the resin exhaust 130 are coupled to the space S hermetically sealed by the seal 114. The resin supply 120 includes a resin supply tank 122, a pipe 124, and an on-off valve 126. The resin supply tank 122 stores the second resin. The pipe 124 couples the resin supply tank 122 and the film 112 to each other. The pipe 124 is detachably attached to the film 112. The on-off valve 126 is provided in the pipe 124. The on-off valve 126 opens and closes a channel formed in the pipe 124.

The resin exhaust 130 includes a vacuum pump 132, a resin exhaust tank 134, and a pipe 136. A suction side of the vacuum pump 132 is coupled to the film 112 via the pipe 136. A discharge side of the vacuum pump 132 is coupled to the resin exhaust tank 134. The vacuum pump 132 sucks the air and the second resin in the space S. The resin exhaust tank 134 stores the second resin sucked by the vacuum pump 132. The pipe 136 is detachably attached to the film 112.

Figure 5A:
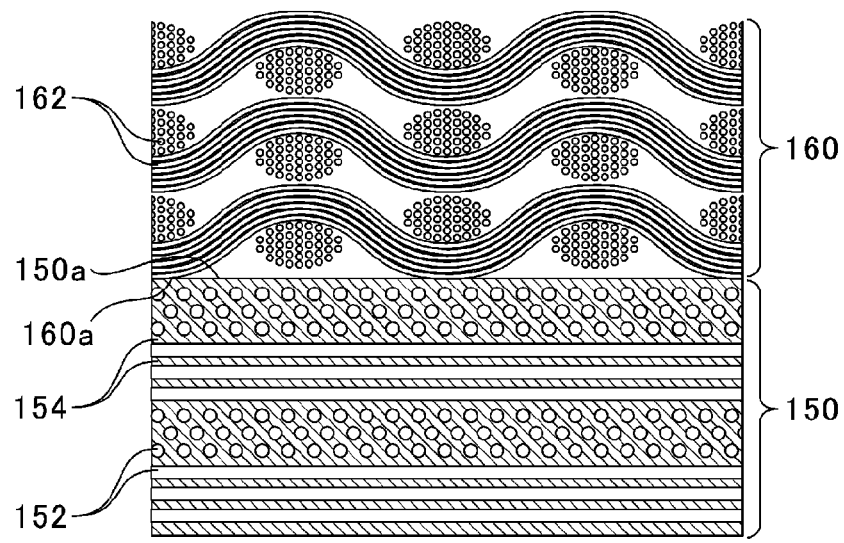
FIGS. 5A to 5C are diagrams illustrating a first base and a second base in the method of manufacturing the composite.
Figure 5B:
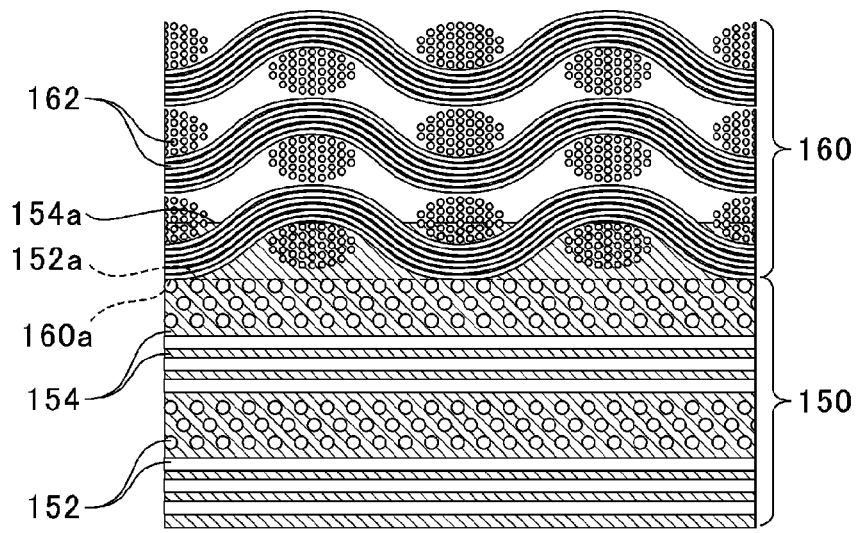
Figure 5C:
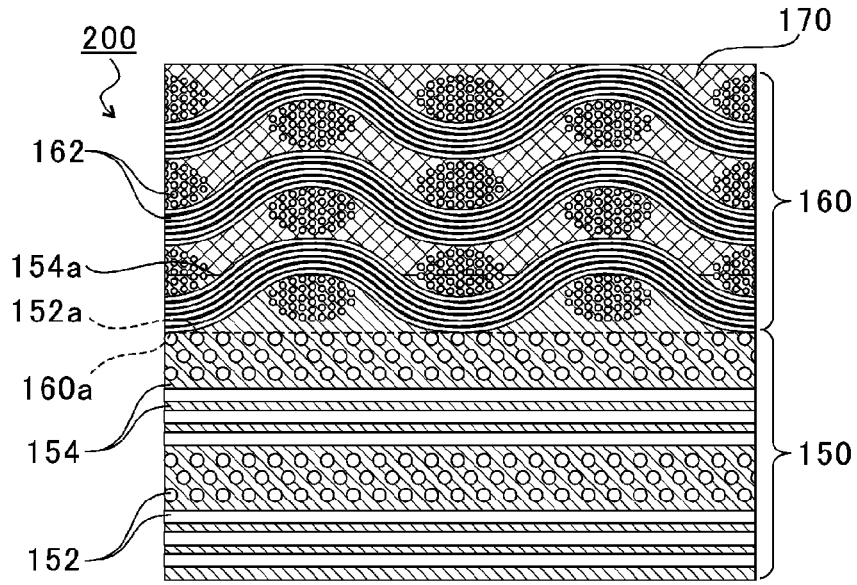

Next, the above-described respective steps of the method of manufacturing the composite are described. FIGS. 5A to 5C are diagrams illustrating the first base 150 and the second base 160 in the method of manufacturing the composite. FIGS. 5A to 5C illustrate a first resin 154 by hatching and a second resin 170 by cross hatching.

Contact Step S110

In the contact step S110, the first base 150 is placed on the forming die 110 first. The jig 116 is disposed on the first base 150, and then the second base 160 is placed on the jig 116. The jig 116 includes a plurality of jigs 116, and the jigs 116 are disposed at predetermined intervals between the first base 150 and the second base 160.

Then, as illustrated in FIG. 5A, a portion of an upper surface 150a (a first surface) of the first base 150 comes into contact with a portion of a lower surface 160a (a second surface) of the second base 160. That is, the contact step S110 is a step of bringing the upper surface 150a of the first base 150 into contact with the lower surface 160a of the second base 160.

The first base 150 includes a first fiber base 152 and the first resin 154 (a first resin). In the embodiment, the first base 150 is a prepreg in which the first fiber base 152 is entirely impregnated with the first resin 154.

The second base 160 includes a second fiber base 162. In the embodiment, the second base 160 is a preform constituted of the second fiber base 162. In other words, the second base 160 is a second fiber base 162 not impregnated with a resin.

The first fiber base 152 and the second fiber base 162 are constituted of any one or a plurality of carbon fiber, glass fiber, boron fiber, aramid fiber, and polyarylate fiber (for example, Vectran (registered trademark) fiber). Note that the first fiber base 152 and the second fiber base 162 may be constituted of the same fiber or may be constituted of different fibers.

The first resin 154 is one of a thermosetting resin and a thermoplastic resin.

The thermosetting resin is, for example, any one or a plurality of phenolic resin (PF), epoxy resin (EP), melamine resin (MF), urea resin (UF), unsaturated polyester resin (UP), alkyd resin, polyurethane (PUR), thermosetting polyimide (PI), benzoxazine, and polybismaleimide (BMI).

The thermosetting resin is, for example, any one or a plurality of polyphenylene sulfide (PPS), polytetrafluoroethylene, polysulfone (PSF), polyethersulfon (PES), amorphous polyarylate (PAR), liquid crystal polymer (LCP), polyetheretherketone (PEEK), thermoplastic polyimide (PI), polyamidoimide (PAI), polyamide (PA), nylon, polyacetal (POM), polycarbonate (PC), modified-polyphenyleneether (m-PPE), polyethylene terephthalate (PET), polybutylene terephthalate (PBT), cyclic polyolefin (COP), polyethylene (PE), polypropylene (PP), polyvinyl chloride (PVC), polyvinylidene chloride, polystyrene (PS), polyvinyl acetate (PVAc), polyurethane (PUR), ABS resin, AS resin, acrylic resin (PMMA), and polyetherketoneketone (PEKK).

First Impregnation Step S120

The first impregnation step S120 is a step of impregnating the second fiber base 162 with a portion of the first resin 154 with which the first fiber base 152 is impregnated. In the embodiment, first, the resin diffusing medium 118 is placed on the second fiber base 162, and the film 112 is placed on the resin diffusing medium 118. Then, the seal 114 is provided between the film 112 and the forming die 110 to surround the peripheries of the first base 150, the second base 160, and the resin diffusing medium 118. Accordingly, the hermetically sealed space S is formed between the film 112 and the forming die 110. The first base 150, the second base 160, the jig 116, and the resin diffusing medium 118 are housed in the space S. Then, the pipe 124 of the resin supply 120 and the pipe 136 of the resin exhaust 130 are coupled to the film 112. Note that, at this time, the on-off valve 126 is closed.

A heating device (not illustrated) increases the temperature in the space S to a temperature within a predetermined melting temperature range, and maintains the first base 150 and the second base 160 within the melting temperature range of the first resin 154. The melting temperature range is a predetermined temperature range including a temperature at which the first resin 154 is molten. When the first resin 154 is molten, the vacuum pump 132 is driven.

Then, as the results of capillary action and suction by the vacuum pump 132, as illustrated in FIG. 5B, the second fiber base 162 is impregnated with a portion of the first resin 154 of the first base 150. After the first impregnation step S120 is executed, one surface 152*a* (an upper surface) of the first fiber base 152 comes into contact with one surface of the second fiber base 162 (the lower surface 160*a* of the second base 160). An interface 154*a* of the first resin 154 is formed in the second fiber base 162.

Second Impregnation Step S130

The second impregnation step S130 is a step of impregnating the second fiber base 162 with the second resin 170. In the second impregnation step S130 according to the embodiment, the on-off valve 126 is opened while the driving of the vacuum pump 132 is driven. Then, the second resin 170 stored in the resin supply tank 122 is supplied into the space S.

When the first resin 154 is a thermosetting resin, the second resin 170 is a thermosetting resin.

When the first resin 154 is a thermoplastic resin, the second resin 170 is a thermoplastic resin. The kind of the second resin 170 may be the same as the kind of the first resin 154, or may differ from the kind of the first resin 154.

The second resin 170 supplied into the space S is diffused on the entire upper surface of the second fiber base 162 by the resin diffusing medium 118. As illustrated in FIG. 5C, the second fiber base 162 of the second base 160 is impregnated with the second resin 170 diffused by the resin diffusing medium 118. The second resin 170 moves vertically downward in the second fiber base 162 and comes into contact with the interface 154*a* of the first resin 154. That is, when the second impregnation step S130 is executed, a portion of the second fiber base 162 without the first resin 154 impregnated is impregnated with the second resin 170.

Note that the excessive second resin 170 which is included in the second resin 170 supplied by the resin supply 120 and with which the second base 160 is not impregnated is exhausted to the resin exhaust tank 134 of the resin exhaust 130.

Setting Step S140

The setting step S140 is a step of setting the first resin 154 and the second resin 170.

For example, when the first resin 154 and the second resin 170 are a thermosetting resin, the heating device (not illustrated) increases the temperature in the space S to a predetermined setting temperature, and maintains the temperature in the space S at the setting temperature. The setting temperature is a temperature at which the first resin 154 and the second resin 170 are set.

When the setting step S140 is executed, a composite 200 illustrated in FIG. 5C is manufactured. The composite 200 includes the first fiber base 152, the second fiber base 162 having the one surface (the lower surface 160*a*) that is in contact with the one surface 152*a* of the first fiber base 152, the first resin 154 that continuously fills a portion of the second fiber base 162 and the first fiber base 152, and the second resin 170 that fills the second fiber base 162 and that is in contact with the first resin 154. A boundary plane (the interface 154*a*) between the first resin 154 and the second resin 170 is formed on an inner side of the second fiber base 162 with respect to a contact plane between the one surface 152*a* of the first fiber base 152 and the one surface (the lower surface 160*a*) of the second fiber base 162.

That is, the outer plate 9 and the stringer 11 are permanently affixed. At this time, the protrusion 11*b* of the stringer 11 is formed by the jig 116.

After the outer plate 9 and the stringer 11 are formed, the jig 116 is pulled and removed from between the outer plate 9 and the stringer 11. Thus, as illustrated in FIG. 2, the hollow 11*c* is formed between the outer plate 9 and the protrusion 11*b* of the stringer 11.

As described above, with the method of manufacturing the composite according to the embodiment, the contact plane (the boundary plane) between the first fiber base 152 that is to constitute the first base 150 and the second fiber base 162 that is to constitute the second base 160 can differ from the contact plane (the boundary plane) between the first resin 154 and the second resin 170. Thus, the peeling strength between the first base 150 and the second base 160, that is, the peeling strength between the first fiber base 152 and the second fiber base 162 can be increased.

Accordingly, unlike the composite of the related art formed by stacking prepregs, progress of a crack and interlayer peeling can be reduced between the first fiber base 152 and the second fiber base 162 without fastening the first base 150 and the second base 160 to each other with a fastener or the like.

Example

As an example, a composite 200 was manufactured by using a prepreg (the first base 150) in which a carbon fiber (the first fiber base 152) was impregnated with an epoxy resin A (the first resin 154), and a preform (the second base 160) constituted of a carbon fiber (the second fiber base 162), and executing the contact step S110, the first impregnation step S120, the second impregnation step S130, and the setting step S140. For the second resin 170 with which the carbon fiber of the preform was impregnated in the second impregnation step S130, an epoxy resin B was used.

In contrast, as a comparative example, a composite was manufactured by stacking a prepreg (the first base 150) in which a carbon fiber (the first fiber base 152) was impregnated with an epoxy resin A (the first resin 154), and a prepreg in which a carbon fiber was impregnated with an epoxy resin B.

Figure 6:
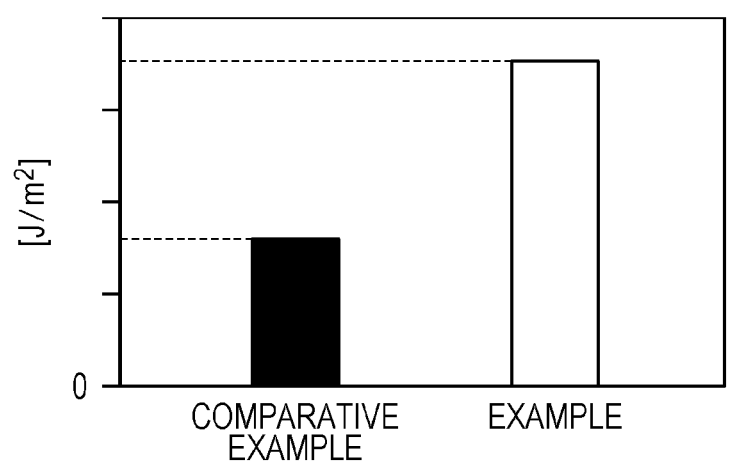
FIG. 6 is a graph illustrating fracture toughness values (mode 1) according to an example and a comparative example.

Fracture toughness values (mode 1) [$J/m^2$] were measured for the example and the comparative example. FIG. 6 is a graph illustrating the fracture toughness values (mode 1) according to the example and the comparative example. In FIG. 6, the example is indicated white and the comparative example is indicated black. As illustrated in FIG. 6, the fracture toughness value (mode 1) of the example is twice or more larger than that of the comparative example.

As the results, it is ensured that the above-described composite 200 and the method of manufacturing the composite 200 can increase the peeling strength between the fiber bases as compared with the composite of the related art formed by stacking the prepregs.

The desirable embodiment according to the disclosure has been described above with reference to the attached drawings. However, the disclosure is not limited to the embodiment. It is obvious that a person skilled in the art can conceive various modified examples or corrected examples within the scope described in the claims, and it is understood that the modified and corrected examples obviously belong to the technical scope of the disclosure.

For example, in the above-described embodiment, the first base 150 is the prepreg. However, the first base 150 may be a one-side tack prepreg in which one surface of the first fiber base 152 is impregnated with the first resin 154. Likewise, in the above-described embodiment, the second base 160 is the preform for example. However, the second base 160 may be a one-side tack prepreg in which one surface of the second fiber base 162 is impregnated with a resin. In this case, the contact step S110 brings the first surface of the first fiber base 152 that is to constitute the first base 150 impregnated with the first resin 154 into contact with the second surface of the second fiber base 162 that is to constitute the second base 160 not impregnated with a resin.

Also, in the contact step S110 of the above-described embodiment, the second base 160 is placed on the first base 150 for example. However, the positional relationship between the first base 150 and the second base 160 is not limited as long as the contact step S110 can bring the first surface impregnated with the first resin 154 of the first fiber base 152 that is to constitute the first base 150 into contact with the second surface not impregnated with a resin of the second fiber base 162 that is to constitute the second base 160. For example, in the contact step S110, the first base 150 may be placed on the second base 160.

Also, in the first impregnation step S120 of the above-described embodiment, the first base 150 and the second base 160 are placed in vacuum for example. However, the first impregnation step S120 may simply maintains the first base 150 and the second base 160 at the melting temperature after the contact step S110 is executed. Also, after the first base 150 and the second base 160 are maintained at the melting temperature, a pressure may be applied thereto.

Also, in the setting step S140 of the above-described embodiment, the first base 150 and the second base 160 are heated to the setting temperature for example. However, when the first resin 154 and the second resin 170 are a thermoplastic resin, the setting step S140 may cool the first base 150 and the second base 160 to the setting temperature.

In the above-described embodiment, the composite 200 is manufactured for example. The composite 200 includes the first fiber base 152, the second fiber base 162 having the one surface (the lower surface 160a) that is in contact with the one surface 152a of the first fiber base 152, the first resin 154 that continuously fills a portion of the second fiber base 162 and the first fiber base 152, and the second resin 170 that fills the second fiber base 162 and that is in contact with the first resin 154. The boundary plane (the interface 154a) between the first resin 154 and the second resin 170 is formed on the inner side of the second fiber base 162 with respect to the contact plane between the one surface 152a of the first fiber base 152 and the one surface (the lower surface 160a) of the second fiber base 162. However, in the composite 200, the first resin 154 may simply fills a portion of the second fiber base 162 and the first fiber base 152.

Also, in the above-described embodiment, the composite 200 is manufactured by the VaRTM method for example. However, the method of manufacturing the composite 200 is not limited. For example, the composite 200 may be manufactured by a resin transfer molding (RTM) method, a resin film infusion (RFI) method, and a wet layup method, or the like.

Also, in the above-described embodiment, the first fiber base 152 and the second fiber base 162 are constituted of the resins for example. However, either or both of the first fiber base 152 and the second fiber base 162 may be constituted of a metal.

Also, in the above-described embodiment, the first base 150 is configured such that the first fiber base 152 is impregnated with the first resin 154 for example. However, the first base 150 may be configured such that the first fiber base 152 is impregnated with a fluid other than a resin. The fluid is turned into a solid (a solid body) by treating the fluid with certain processing. The fluid may be, for example, one of metal and concrete. Likewise, in the second impregnation step S130, the second fiber base 162 may be impregnated with a fluid instead of the second resin 170.

The invention claimed is:
1. A method of manufacturing a composite, the method comprising:
   disposing a first base on a forming die;
   disposing a second base so as to bring a first surface of the first base into contact with at least part of a second surface of the second base,
   wherein:
      the first base includes the first surface having a first fiber base impregnated with a first resin; and
      the second base includes the second surface having a second fiber base not impregnated with a second resin; and
   impregnating the second fiber base with a portion of the first resin with which the first fiber base is impregnated,
   wherein the impregnating the second fiber base with the portion of the first resin comprises:
      attaching a film to the forming die to form a hermetically sealed space that houses at least the first base and the second base between the film and the forming die;
      disposing a vacuum pump configured to suck an air and the second resin within the hermetically sealed space to an outside of the hermetically sealed space;
      maintaining the hermetically sealed space that houses at least the first base and the second base having the first surface and the second surface in contact with each other within a melting temperature range of the first resin; and
      driving, when the first resin is molten, the vacuum pump to impregnate the second fiber base with the portion of the first resin, and
   wherein the method further comprises, after the impregnating the second fiber base with the portion of the first resin:
      supplying, while the driving vacuum pump is kept, the second resin into the hermetically sealed space to fill the second fiber base with the second resin so that the second resin is in contact with the portion of the first resin; and
      executing either one of:
         heating the first base and the second base when both of the first resin and the second resin are a thermosetting resin; and
         cooling the first base and the second base when both of the first resin and the second resin are a thermoplastic resin.
2. The method of manufacturing a composite according to claim 1, wherein the first base is one of:
   a prepreg; and
   a one-side tack prepreg having the first surface.

3. The method of manufacturing a composite according to claim 1, wherein the second base is one of:
   a fiber preform; and
   a one-side tack prepreg having the second surface.

4. The method of manufacturing a composite according to claim 2, wherein the second base is one of:
   a fiber preform; and
   a one-side tack prepreg having the second surface.

5. The method of manufacturing a composite according to claim 1, wherein the first base includes a prepreg in which the first fiber base is entirely impregnated with the first resin.

6. The method of manufacturing a composite according to claim 1, wherein the method further comprises, after the impregnating the second fiber base with the portion of the first resin and before the supplying the second resin into the hermetical sealed space, disposing a resin diffusion medium between the film and the second fiber base so that the supplied second resin is diffused on an entirety of an upper surface of the second fiber base, and impregnated vertically downward from a top of the second base towards the second fiber surface of the second base to come into contact with the first resin that has been impregnated in the second fiber base.

7. The method of manufacturing a composite according to claim 1, further comprising filling a portion of the second fiber base without the first resin with the second resin.

8. The method of manufacturing a composite according to claim 1, wherein an amount of the first resin impregnated in the second base is less than an amount of the second resin impregnated in the second base.

* * * * *